(12) United States Patent
Tian

(10) Patent No.: US 11,674,867 B2
(45) Date of Patent: Jun. 13, 2023

(54) UNMANNED AERIAL VEHICLE (UAV) TEST BENCH

(71) Applicant: Shanghai Autoflight Co., Ltd., Shanghai (CN)

(72) Inventor: Yu Tian, Hong Kong (CN)

(73) Assignee: SHANGHAI AUTOFLIGHT CO., LTD., Jiangsu Province (CN)

( * ) Notice: Subject to any disclaimer, the term of this patent is extended or adjusted under 35 U.S.C. 154(b) by 0 days.

(21) Appl. No.: 17/882,564

(22) Filed: Aug. 6, 2022

(65) Prior Publication Data

US 2023/0052429 A1 Feb. 16, 2023

(30) Foreign Application Priority Data

Aug. 6, 2021 (CN) .......................... 202121830681.6

(51) Int. Cl.
*G01M 17/007* (2006.01)
*B64F 5/60* (2017.01)

(52) U.S. Cl.
CPC ............. *G01M 17/007* (2013.01); *B64F 5/60* (2017.01)

(58) Field of Classification Search
CPC ................................ G01M 17/007; B64F 5/60
See application file for complete search history.

(56) References Cited

FOREIGN PATENT DOCUMENTS

CN   111284730 A  *  6/2020
CN   212922017 U  *  4/2021

OTHER PUBLICATIONS

S Jatsun et al 2020 IOP Conf. Ser.: Mater. Sci. Eng. 714 012009 (Year: 2020).*

* cited by examiner

*Primary Examiner* — Eric S. McCall
*Assistant Examiner* — Timothy P Graves
(74) *Attorney, Agent, or Firm* — WPAT Law, P.C.; Anthony King

(57) ABSTRACT

An unmanned aerial vehicle (UAV) test bench, which falls within the technical field of UAV test, comprising a support component, a universal rotating component, a fixed component and a return component: the universal rotating component slides along the Z direction and is arranged on the support component, and one end of the universal rotating component can rotate in a universal way relative to the other end of the universal rotating component. The fixed component is connected to one end of the universal rotating component, and the fixed component is configured to fix the UAV. One end of the return component is connected to the support component, the other end is connected to the other end of the universal rotating component, and the return component is configured to drive the universal rotating component and the fixed component to reset.

9 Claims, 6 Drawing Sheets

UNMANNED AERIAL VEHICLE (UAV) TEST BENCH

TECHNICAL FIELD

The application relates to the technical field of UAV test, in particular to a UAV test bench.

BACKGROUND ART

In the process of UAV research & development, it is necessary to simulate the actual flight conditions of UAV. Among them, the actual flight conditions comprises pitching, lifting and so on to conduct comprehensive tests on the whole UAV.

In the prior art, when the UAV needs to carry out the lifting test, it is necessary to place the UAV on the lifting device, fix the UAV on the lifting device, and complete the lifting test. When the UAV needs to conduct the pitching test, it needs to be placed on the pitching device, and the UAV is fixed on the pitching device to complete the pitching test.

It can be seen that at least two devices are required for the UAV test in the prior art so that the two devices occupy a large space. In the process of the test, the UAV needs to be removed from the lifting device and then installed on the pitching device. The intermediate transfer process takes more time, and there may involve multiple transfers, resulting in the low efficiency of the UAV test process.

SUMMARY OF THE APPLICATION

The application aims to provide a UAV test bench. The lifting test and pitching test of the UAV can be carried out on the UAV test bench without multiple transfers of the UAV, thereby reducing the time required for intermediate transfers and improving the efficiency of the UAV test.

As conceived above, the technical solution adopted by the application is:
A UAV test bench, comprising:
A support component;
A universal rotating component, which is slidably arranged on the support component along the Z direction, and one end of the universal rotating component can rotate in a universal manner relative to the other end of the universal rotating component;
A fixing component, which is connected to one end of the universal rotating component, and the fixing component is configured to fix the UAV;
A return component, one end of which is connected to the support component, and the other end of which is connected to the other end of the universal rotating component. The return component is configured to drive the universal rotating component and the fixing component to reset.

The support component includes a support frame, a first support plate, a second support plate and a plurality of support columns, the first support plate is fixedly connected to one end of the support frame, the second support plate is connected with the first support plate through the support column, the first support plate has a first through hole, the universal rotating assembly slides on the first through hole, and one end of the return component is connected to the first support plate, the second support plate is configured to support the fixing component.

The universal rotating component comprises a universal joint, a limit sleeve and a fixing shaft, the universal joint comprises a first end and a second end capable of universal rotation relative to the first end, the limit sleeve is arranged outside the universal joint and is fixedly connected to the first end, the fixed component is connected to the second end of the universal joint, and one end of the fixing shaft is connected to the first end of the universal joint, and the other end of the return component is connected to the fixing shaft.

It also includes a bearing seat, a bearing, and a connecting shaft. The bearing is installed in the shaft hole of the bearing seat, one end of the connecting shaft is rotationally connected to the bearing seat and in contact with the inner surface of the bearing, the other end of the connecting shaft is fixedly connected to the other end of the fixing shaft, and the other end of the return component is connected to the bearing seat.

It also includes a first lifting ring fixed on the bearing seat and a second lifting ring fixed on the support component. The return component includes a spring, one end of the spring is hooked on the second lifting ring, and the other end of the spring is hooked on the first lifting ring.

The UAV test bench also includes a linear bearing fixing seat fixed on the first support plate and a linear bearing installed in the linear bearing fixing seat, and the fixing shaft is threaded in the linear bearing.

It also includes a limit ring fixed in the middle of the fixed shaft, the size of the limit ring in the horizontal direction is larger than the inner diameter of the linear bearing, the fixing shaft slides to the first limit along the Z direction, and the limit ring butts with the linear bearing or the linear bearing fixing seat.

It also includes a roller and a trailer jack fixed on the roller, and the output end of the trailer jack is connected to the other end of the support frame.

The fixing component includes a connecting seat, a fixing plate and a clamping part, the connecting seat is fixedly connected to the universal rotating component and is slidably connected to the support component, the fixing plate is fixedly connected to the connecting seat, the clamping part is provided in two groups, and the two groups of the clamping parts are fixedly connected to both ends of the fixing plate, respectively.

The clamping part comprises a first clamping plate and a second clamping plate connected with each other, the top surface of the first clamping plate is provided with a first arc groove, the bottom surface of the second clamping plate is provided with a second arc groove, and the first arc groove and the second arc groove form an airfoil hole.

The application has at least the following beneficial effects:
The UAV test bench provided by the application, the universal rotating component and the fixing component are sliding on the support component along the Z direction, so that the UAV test bench can meet the requirements of the UAV lifting test, and one end of the universal rotating component can rotate in a universal manner relative to the other end of the universal rotating component, the UAV test bench can meet the requirements of the UAV pitching test, and then the UAV test bench provided by the application can meet the requirements of the UAV lifting test and the pitching test at the same time, without the need to transfer the UAV for many times, thereby reducing the time required for intermediate transfer and improving the efficiency of the UAV test.

Figure 1:
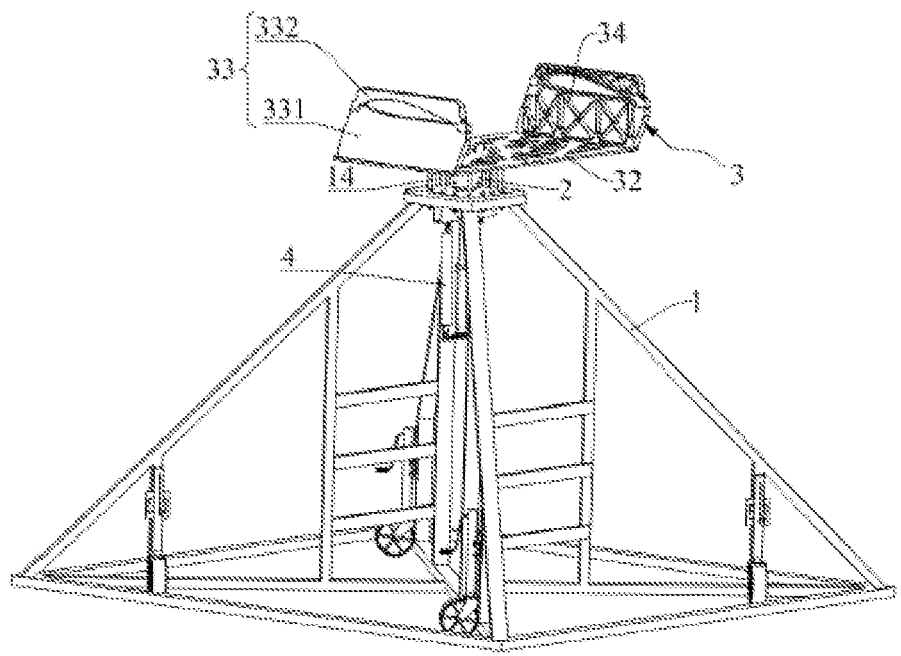
FIG. 1 is the structural diagram of the UAV test bench provided by an embodiment of the application.

In the figures,
1. Support component; 11. Support frame; 12. First support plate; 13. Second support plate; 14. Support column;
2. Universal rotating component; 21. Universal joint; 211. First end; 212. Second end; 22. Limit sleeve; 23. Fixing shaft; 24. First connector;
3. Fixing components; 31. Connecting seat; 32. Fixing plate; 33. Clamping component; 330. Airfoil hole; 331. First clamping plate; 332. Second clamping plate; 34. First reinforcing plate;
4. Return component; 5. Bearing seat; 6. Bearing; 7. Connecting shaft; 8. First lifting ring; 9. Second lifting ring; 10. Linear bearing fixing seat; 20. Linear bearing; 30. Limit ring; 40. Roller; 50. Trailer jack; 60. Second connector.

DESCRIPTION OF THE PREFERRED EMBODIMENTS

In order to make clearer the technical issues solved, the technical solution adopted and the technical effect achieved by the application, the technical solution of the application is further described below in combination with the figures and through the description of the preferred embodiments. It can be understood that the preferred embodiments described here are only used to explain the application, not to limit the application. In addition, it should be noted that for the convenience of description, only some parts related to the application rather than all of them are shown in the figures.

In the description of the application, it should be noted that the orientation or position relationship indicated by the terms "center", "upper", "lower", "left", "right", "vertical", "horizontal", "inner", "outer" and so on is based on the orientation or position relationship shown in the figures, only for the convenience of describing the application and simplifying the description, rather than indicating or implying that the device or element referred to must have a specific orientation, or be constructed and operated in a specific direction, so it cannot be understood as a limitation of the application. In addition, the terms "first" and "second" are used only for descriptive purposes and cannot be understood as indicating or implying relative importance.

In the description of the application, it should be noted that unless otherwise specified and limited, the terms "installation", "connect" and "connection" should be understood in a broad sense, for example, it can be fixedly connected or detachably connected. It can be mechanical connection or electrical connection. It can be directly connected, or indirectly connected through an intermediate medium, and it can be the connection between two elements. For those skilled in the art, the specific meaning of the above terms in the application can be understood in specific circumstances.

This application provides a UAV test bench, which can be used to fix the UAV, and the lifting test and pitching test of the UAV can be carried out on the UAV test bench, without multiple transfers of the UAV, thereby reducing the time required for intermediate transfers and improving the efficiency of the UAV test. It should be noted that the lifting test involves fixing the UAV, and then manipulating the lifting and lowering of the UAV, so as to observe or detect the condition of the UAV in the process. Similarly, the pitching test involves fixing the UAV, and then manipulating the UAV to perform the pitch action, so as to observe or detect the condition of the UAV in the process. Exemplarily, the UAV in this embodiment is V400 UAV.

As shown in FIG. 1, the UAV test bench comprises support component 1, universal rotating component 2, fixing component 3 and return component 4.

Among others, the support component 1 is used to support the fixing component 3. The universal rotating component 2 is slidably arranged on the support component 1 in the Z direction, that is, the universal rotating component 2 can slide up and down in the Z direction relative to the support component 1.

Moreover, one end of the universal rotating component 2 can rotate in a universal manner relative to the other end of the universal rotating component 2. Specifically, the top end of the universal rotating component 2 can rotate in a universal manner relative to the bottom end of the universal rotating component 2. It should be noted that the universal rotation in this embodiment means that one end of the universal rotating component 2 can rotate relative to the other end of the universal rotating component 2 with the numerous axes on the horizontal plane as the rotation center. The numerous axes include the X axis in the X direction, the Y axis in the Y direction and the axis between the X axis and the Y axis. However, one end of the universal rotating component 2 cannot rotate around the Z axis.

As shown in FIG. 1, the fixing component 3 is connected to one end of the universal rotating component 2, and the fixing component 3 is used to fix the UAV. During the lifting test, the UAV can drive the fixing component 3 and the universal rotating component 2 to slide on the support component 1. In the pitching test of the UAV, one end of the fixing component 3 and the universal rotating component 2 can be adjusted to rotate in universal direction relative to the other end of the universal rotating component 2, so that the UAV test bench will not interfere with the action of the UAV while fixing the UAV.

Figure 2:
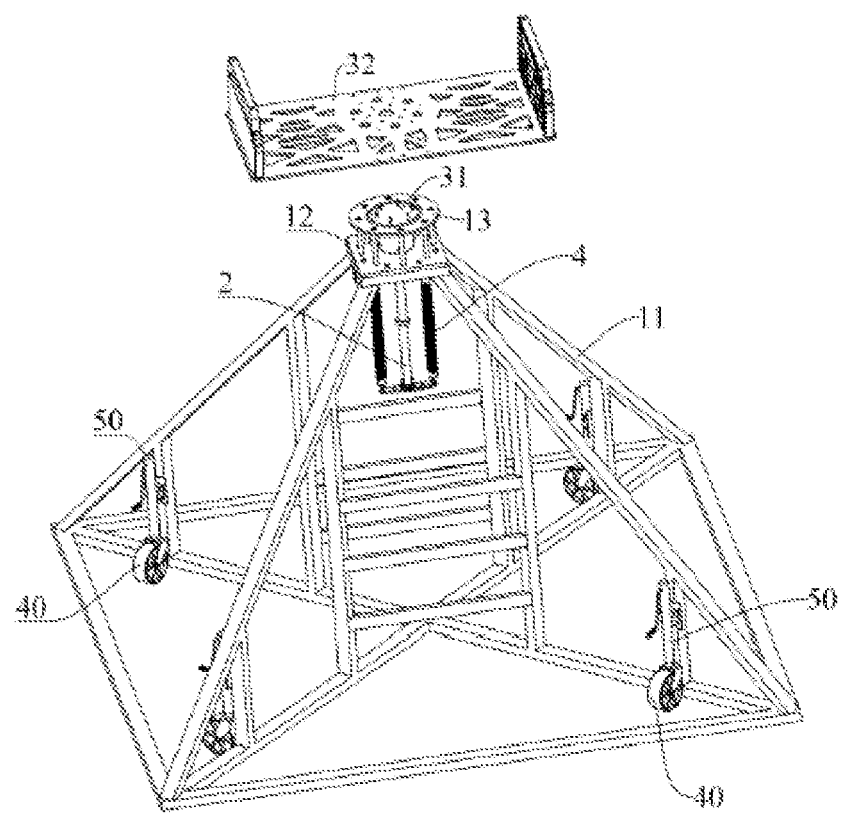
FIG. 2 is the breakdown diagram of the UAV test bench provided by an embodiment of the application.

Referring to FIG. 2, one end of the return component 4 is connected to the support component 1, and the other end of the return component 4 is connected to the other end of the universal rotating component 2. When the universal rotating component 2 slides relative to the support component 1, it can compress the return component 4. When the external force on the universal rotating component 2 disappears, the return component 4 can drive the universal rotating component 2 and the fixing component 3 to reset, which can facilitate other tests.

The UAV test bench provided in this embodiment, the universal rotating component 2 and the fixing component 3 slide on the support component 1 along the Z direction, so that the UAV test bench can meet the requirements of the UAV lifting test, and one end of the universal rotating component 2 can rotate in a universal manner relative to the other end of the universal rotating component 2, so that the UAV test bench can meet the requirements of the UAV pitching test, Thus, the UAV test bench provided in this embodiment can meet the requirements of the UAV lifting test and the pitching test at the same time, without the need to transfer the UAV for many times, thereby reducing the time required for intermediate transfer and improving the efficiency of the UAV test. As shown in FIG. 2, the support component 1 comprises a support frame 11, a first support plate 12, a second support plate 13, and a plurality of support columns 14. The support frame 11 is formed by connecting a plurality of vertical rods, horizontal rods and inclined rods, and the support frame 11 is in a pyramid shape in the whole. The first support plate 12 is fixedly connected to the top of the support frame 11, the second support plate 13 is connected to the first support plate 12 through a plurality of support columns 14, and the first support plate 12 and the second support plate 13 are parallel to each other and parallel to the horizontal plane. The first support plate 12 has a first through hole, and the universal rotating component 2 slides along the Z direction and is arranged in the first through hole. One end of the return component 4 is connected to the first support plate 12, and the second support plate 13 is configured to support the fixing component 3. When the fixing component 3 is in an unstressed state, the fixing component 3 is supported by the second support plate 13. In this embodiment, the second support plate 13 is provided with a second through hole, and the universal rotating component 2 is connected to the fixing component 3 through the second through hole.

As shown in FIG. 2, the fixing component 3 comprises a connecting seat 31, a fixing plate 32, and a clamping part 33. Among others, the connecting seat 31 is fixedly connected to the universal rotating component 2 and slidably connected to the support component 1. Specifically, the connecting seat 31 is slidably arranged in the second through hole. The fixing plate 32 is fixedly connected to the connecting seat 31, and the clamping parts 33 are provided in two groups. The two groups of clamping parts 33 are fixedly connected to both ends of the fixing plate 32, respectively, and each group of clamping parts 33 is used to clamp one wing of the UAV.

Among others, the clamping parts 33 comprise an interconnected first clamping plate 331 and a second clamping plate 332, the first clamping plate 331 and the second clamping plate 332 match with each other to clamp the wing of the UAV, and the bottom end of the first clamping plate 331 is fixedly connected to the fixed plate 32. In some embodiments, the first clamping plate 331 is bolted to the second clamping plate 332, and the bottom end of the first clamping plate 331 is bolted to the fixing part 12.

Further, referring to FIG. 1, the top surface of the first clamping plate 331 has a first arc groove, and the bottom surface of the second clamping plate 332 has a second arc groove. When the first clamping plate 331 is connected to the second clamping plate 332, the first arc groove and the second arc groove form an airfoil hole 330 for clamping the wing of the UAV. The shape and size of the first arc groove and the second arc groove are confirmed, respectively, according to the shape and size of the wing, which is not limited in this embodiment.

Please continue to refer to FIG. 1. A plurality of first reinforcing plates 34 are fixed on the side of each first clamping plate 331, and a plurality of first reinforcing plates 34 are cross fixed on the first clamping plate 331 to improve the structural strength of the first clamping plate 331. Similarly, a plurality of second reinforcing plates (not shown) are fixed on the side of each second clamping plate 332, and the plurality of second reinforcing plates are connected in turn and used to improve the structural strength of the second clamping plate 332.

In this application, a plurality of weight reduction holes are arranged on the fixing plate 32 to make the weight of the fixing plate 32 smaller and facilitate the driving of the fixing plate 32. A plurality of weight reduction holes are symmetrically arranged with the fixing seat 31 so that the symmetrical center could prevent the weight of one end of the fixing plate 32 from being greater than that of the other end, thereby preventing interference with the UAV test.

Referring to FIG. 2, the UAV test bench also comprises a roller 40 and a trailer jack 50 fixedly arranged on the roller 40. The output end of the trailer jack 50 is connected to the other end of the support frame 11, and the trailer jack 50 is used to drive the support frame 11 to rise and fall. Exemplarily, turning the rocker of the trailer jack 50 can extend or retract the output end of the trailer jack 50. The support frame 11 can be rotated by the roller 40.

Figure 3:
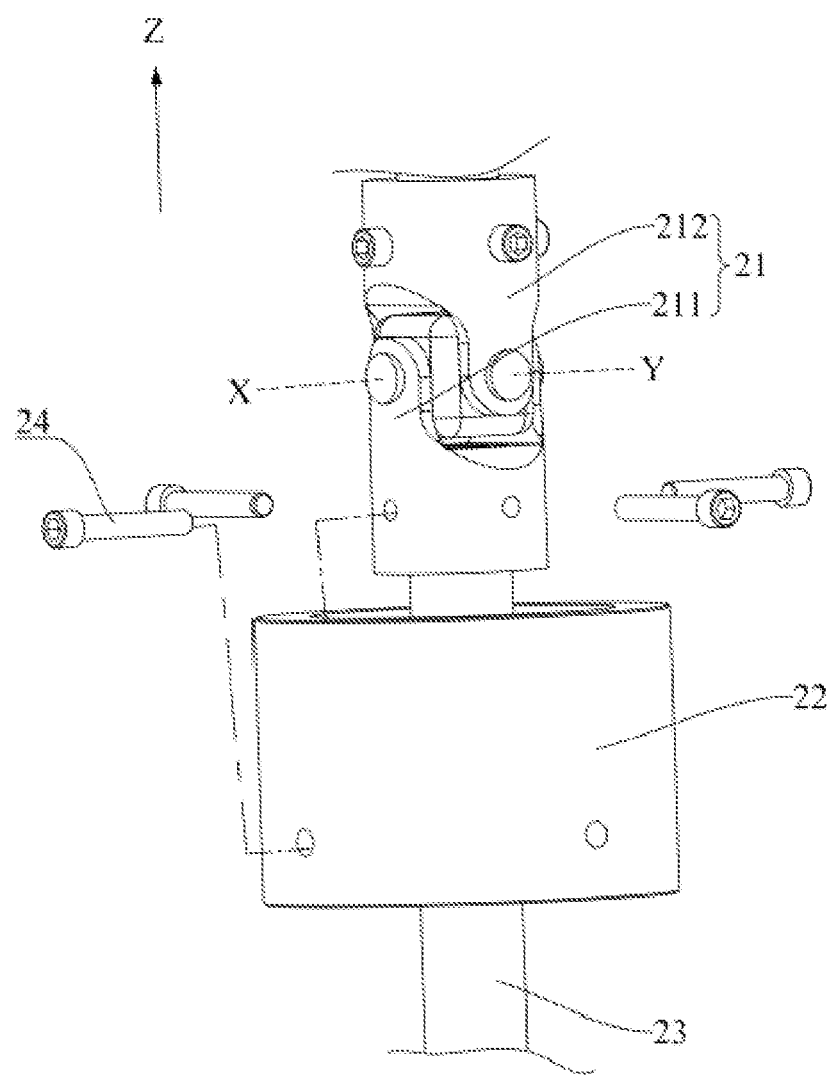
FIG. 3 is the breakdown diagram of the universal rotating component provided by an embodiment of the application.

FIG. 3 is the structural diagram of a universal rotating device provided in this embodiment. As shown in FIG. 3, the universal rotating component 2 comprises a universal joint 21, a limit sleeve 22 and a fixing shaft 23. The universal joint 21 comprises a first end 211 and a second end 212 that can rotate in a universal manner relative to the first end 211. The limit sleeve 22 is sleeved outside the universal joint 21 and fixedly connected to the first end 211. In some embodiments, the first end 211 of the universal joint 21 is fixedly connected to the limit sleeve 22 through the first connector 24. The fixing component 3 is connected to the second end 212 of the universal joint 21, one end of the fixing shaft 23 is connected to the first end 211 of the universal joint 21, and the other end of the return component 4 is connected to the fixing shaft 23. The first connector 24 includes but does not limit studs, screws, bolts, etc.

Further, the inner wall of the limit sleeve 22 is provided with a limit connical surface, which is used to limit the movement range of the second end 212 of the universal joint 21, and then limit the movement range of the fixing component 3, to prevent the fixing component 3 over-movement.

Figure 4:
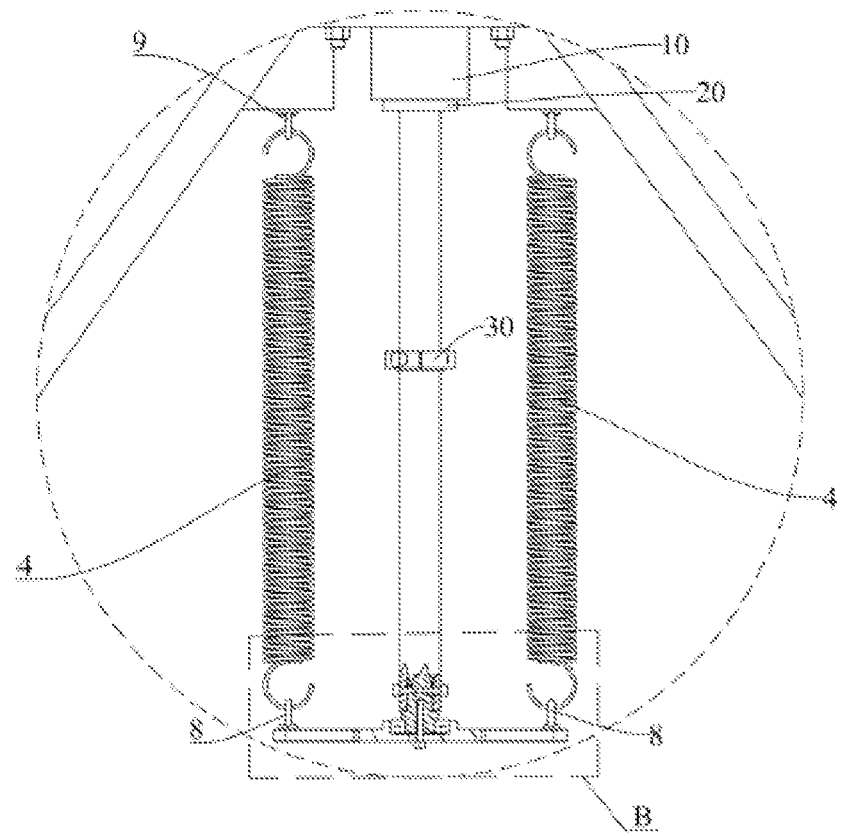
FIG. 4 is a partially enlarged schematic diagram of the UAV test bench provided by an embodiment of the application.
Figure 5:
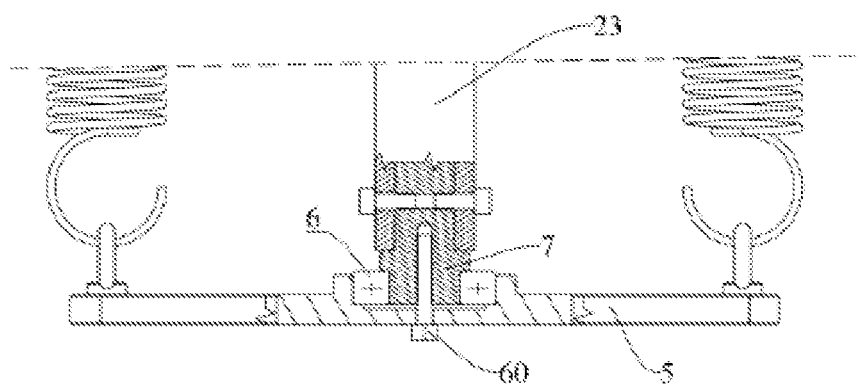
FIG. 5 is the enlarged schematic diagram at location B shown in FIG. 4 of the application.

In this embodiment, as shown in FIGS. 4 and 5, the UAV test bench also comprises a bearing seat 5, a bearing 6 and a connecting shaft 7. Among them, the bearing 6 is installed in the shaft hole of the bearing seat 5, and one end of the connecting shaft 7 is rotatably connected to the bearing seat 5 and in contact with the inner surface of the bearing 6, so that one end of the connecting shaft 7 is supported and limited by the bearing 6 in the horizontal direction. The other end of the connecting shaft 7 is fixedly connected to the other end of the fixing shaft 23, and the fixing shaft 23 can drive the connecting shaft 7 to rotate. Moreover, when the fixing shaft 23 rotates, only the connecting shaft 7 rotates, but the bearing seat 5 does not rotate with the connecting shaft 7. The other end of the return component 4 is connected to the bearing seat 5, that is, the return component 4 is indirectly connected to the other end of the fixing shaft 23 through the bearing seat 5. As shown in FIG. 5, the connecting shaft 7 is rotatably connected to the bearing seat 5 by a second connector 60 passing through the bearing seat 5. The second connector 60 includes but does not limit the structure such as studs, bolts, etc.

Further, the UAV test bench also comprises a first lifting ring 8 fixedly arranged on the bearing seat 5 and a second lifting ring 9 fixedly arranged on the bottom surface of the first support plate 12 of the support component 1. The return component 4 includes a spring, one end of which is hooked on the second lifting ring 9, and the other end of which is hooked on the first lifting ring 8. When the universal rotating component 2 slides forward in the Z direction driven by the UAV, the fixing shaft 23 drives the connecting shaft 7 and the bearing seat 5 to move forward in the Z direction. Since the support component 1 does not move, the spring is compressed and the elastic potential energy is stored. When the external force acting on the universal rotating component 2 disappears, under the action of the spring force, the bearing seat 5 is pushed to move in the negative direction of Z, and the universal rotating component 2 and the fixing component 3 are driven to move in the negative direction of Z, so as to realize the reset of the universal rotating component 2 and the fixing component 3. Among them, the original positions of the universal rotating component 2 and the fixing component 3 are the positions where the fixing component 3 shown in FIG. 6 contacts the second support plate 13.

Figure 7:
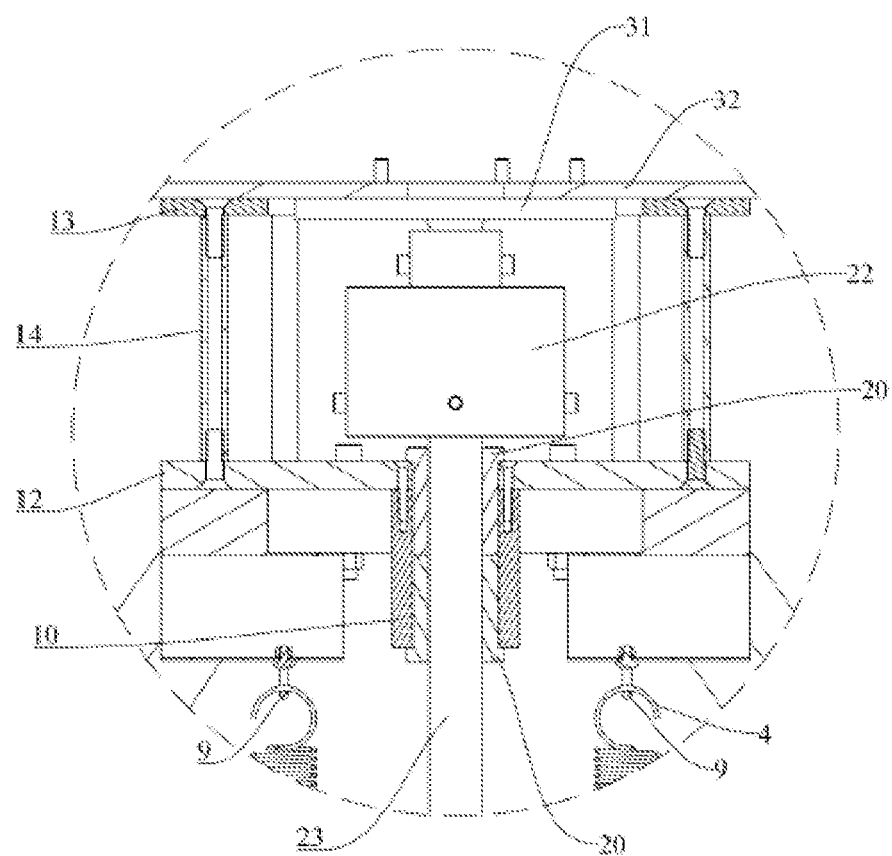
FIG. 7 is the enlarged schematic diagram at location A shown in FIG. 6 of the application.

In order to facilitate the sliding and rotating of the fixing shaft 23 on the first support plate 12, as shown in FIG. 7, the UAV test bench also includes a linear bearing fixing seat 10 fixedly arranged on the first support plate 12 and a linear bearing 20 installed in the linear bearing fixing seat 10. The fixing shaft 23 is threaded in the linear bearing 20, so that the linear bearing 20 can guide the sliding of the fixing shaft 23.

Figure 6:
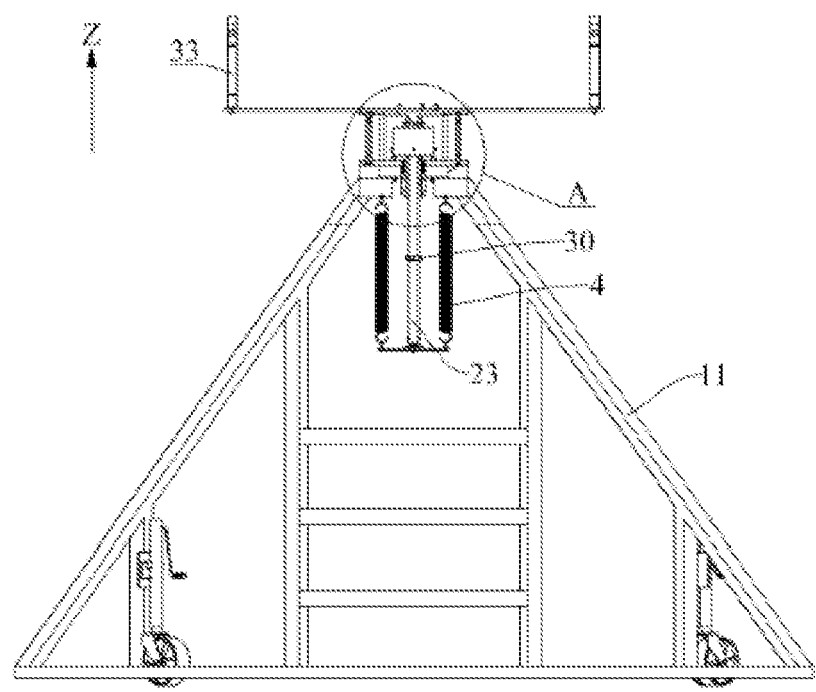
FIG. 6 is the main view of the UAV test bench provided in an embodiment of the application.

Further, referring to FIG. 6, the UAV test bench also comprises a limit ring 30 fixedly arranged in the middle of the fixing shaft 23. The limit ring 30 is sleeved and fixed on the fixing shaft 23, and the size of the limit ring 30 in the horizontal direction is larger than the inner diameter of the linear bearing 20, so that the limit ring 30 will not enter the linear bearing 20. The limit ring 30 is used to limit the movement limit of the fixing shaft 23. Specifically, the fixing shaft 23 slides to the first limit in the positive direction of the Z direction, and the limit ring 30 butts with the linear bearing 20 or the linear bearing fixing seat 10, so that the fixing shaft 23 cannot continue to move in the positive direction of the Z direction, thereby realizing the limit of the fixing shaft 23 and the fixing component 3. The second support plate 13 limits the lower limit of movement of the fixing shaft 23 and the fixing component 3.

The above embodiment only expounds the basic principle and characteristics of the application. The application is not limited by the above embodiment. On the premise of not departing from the spirit and scope of the application, the application also has various changes and alternations, which fall within the breadth and scope of the application. The breadth and scope of the application is defined by the claims appended here and their equivalents.

What is claimed is:

1. An UAV (unmanned aerial vehicle) test bench comprising:
   a support component (1);
   a universal rotating component (2), which is sliding on the support component (1) along a Z direction, and a first end of the universal rotating component (2) can rotate in a universal manner relative to a second end of the universal rotating component (2);
   a fixing component (3), which is connected to the first end of the universal rotating component (2), and the fixing component (3) is configured to fix the UAV;
   a return component (4), wherein a first end of the return component is connected to the support component (1), and a second end of the return component is connected to the second end of the universal rotating component (2); wherein the return component (4) is configured to drive the universal rotating component (2) and the fixing component (3) to reset; and
   wherein the support component (1) comprises a support frame (11), a first support plate (12), a second support plate (13) and a plurality of support columns (14), the first support plate (12) is fixedly connected to a first end of the support frame (11), and the second support plate (13) is connected with the first support plate (12) through the plurality of support columns (14), the first support plate (12) has a first through hole;
   wherein the universal rotating component (2) is configured to slide through the first through hole;
   wherein the first end of the return component (4) is connected to the first support plate (12), and the second support plate (13) is configured to support the fixing component (3).

2. The UAV test bench according to claim 1, which is characterized in that the universal rotating component (2) comprises a universal joint (21), a limit sleeve (22) and a fixed shaft (23), the universal joint (21) comprises a first end of the universal joint (211) and a second end of the universal joint (212) capable of universal rotation relative to the first end of the universal joint (211), and the limit sleeve (22) is sleeved outside the universal joint (21) and fixedly connected to the first end of the universal joint (211), the fixing component (3) is connected to the second end (212) of the universal joint (21), a first end of the fixed shaft (23) is connected to the first end (211) of the universal joint (21), and a second end of the fixed shaft (23) is connected to the return component (4).

3. The UAV test bench according to claim 2, which is characterized in that it further includes a bearing seat (5), a bearing (6) and a connecting shaft (7), the bearing (6) is installed in a shaft hole of the bearing seat (5), wherein a first end of the connecting shaft (7) is rotatably connected to the bearing seat (5) and in contact with an inner surface of the bearing (6), a second end of the connecting shaft (7) is fixedly connected to the second end of the fixed shaft (23), and the second end of the return component (4) is connected to the bearing seat (5).

4. The UAV test bench according to claim 3, which is characterized in that it further includes a first lifting ring (8) fixed on the bearing seat (5) and a second lifting ring (9) fixed on the support component (1), the return component (4) includes a spring, wherein a first end of the spring is hooked on the second lifting ring (9), and wherein a second end of the spring is hooked on the first lifting ring (8).

5. The UAV test bench according to claim 2, which is characterized in that the UAV test bench further includes a linear bearing fixing seat (10) fixed on the first support plate (12) and a linear bearing (20) installed in the linear bearing fixing seat (10), and the fixing shaft (23) is threaded in the linear bearing (20).

6. The UAV test bench according to claim 5, which is characterized in that it further includes a limit ring (30) fixed in the middle of the fixing shaft (23), the size of the limit ring (30) in the horizontal direction is larger than the inner diameter of the linear bearing (20), and when the fixing shaft (23) slides to a first limit along the Z direction, the limit ring (30) is butted with the linear bearing (20) or the linear bearing fixing seat (10).

7. The UAV test bench according to claim 1, which is characterized in that it further includes a roller (40) and a trailer jack (50) fixed on the roller (40), and the output end of the trailer jack (50) is connected to a second end of the support frame (11).

8. The UAV test bench according to claim 1, which is characterized in that the fixing component (3) comprises a connecting seat (31), a fixing plate (32) and two clamping parts (33), the connecting seat (31) is fixedly connected to the universal rotating component (2) and is slidably connected to the support component (1), the fixing plate (32) is fixedly connected to the connecting seat (31), and the two clamping parts (33) are each provided in two assemblies, and one of the two clamping parts (33) are fixedly connected to each end of the fixing plate (32), respectively.

9. The UAV test bench according to claim 8, which is characterized in that each of the two clamping parts (33) comprises an interconnected first clamping plate (331) and a second clamping plate (332), a top surface of the first clamping plate (331) is provided with a first arc groove, a bottom surface of the second clamping plate (332) is provided with a second arc groove, and the first arc groove and the second arc groove form an airfoil hole (330).

* * * * *